Aug. 11, 1936.  E. ÖSTERLUND NEÉ MALMQVIST  2,050,893
FLOWER STAND
Filed May 15, 1935
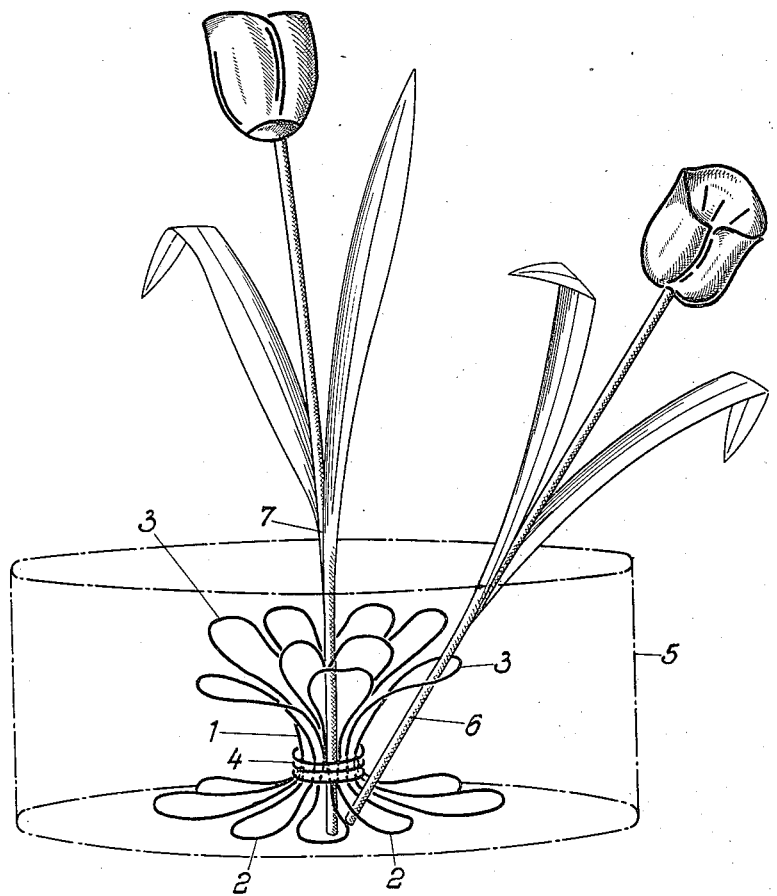
Inventor:

Patented Aug. 11, 1936

2,050,893

UNITED STATES PATENT OFFICE 2,050,893

FLOWER STAND

Elly Österlund née Malmqvist, Karlskrona, Sweden

Application May 15, 1935, Serial No. 21,584
In Sweden August 26, 1934

3 Claims. (Cl. 47—41)

The present invention relates to a flower-stand. The hitherto known flower-stands are open to several objections of which the most noticeable is that the stand is not adapted for different kinds of water vessels for flowers, for example bowls and vases, and is not adapted for stalks of different thickness. The flower-stand according to the present invention meets all requirements for practical use, it is very cheap to produce.

An embodiment of the flower-stand according to the invention is diagrammatically shown in the only figure of the accompanying drawing.

The flower-stand 1 consists of loops 2 and 3 made of flexible wire, which are held together by a ring 4 composed of one or several wire windings. The lower loops 2 of the flower-stand rest on the bottom of the bowl 5 which is illustrated by broken lines in the drawing.

The stalks are inserted in the holder and a portion of the stalks may extend first through an upper loop 3 and then through the corresponding lower loop 2 or between two of the lower loops, the end of the stalk resting upon the bottom of the bowl. Several stalks can also be inserted like the stalk 7 in the middle of the holder between the upper loops 3 and the ring 4.

If it is desired to place the flowers in a smaller vase, the flower-stand according to the present invention can be used. Owing to the fact that the loops are made of flexible material, the lower loops can be pressed together so that the stand fits into the opening of the vase. The flower-stand is then pressed into the vase so far that it does not reach above the upper end of the same. As the flowers are inserted in the loops the flowers can be held at any desired height in the vase.

With the aid of the flower-stand according to the present invention the flowers can be arranged in any desired bowl and in any desired quantity in an artistic manner. The flower stalks can extend from the same point situated on an imagined center line through the flower-stand. Such an arrangement of flowers is important and tasty for all flower decorations.

The flower-stand consists of a long, flexible non-rusting metal wire which is bent in double loops. A wire is wound to form a ring which holds together the loops.

The flower-stand can also be made in a manner other than above described without departing from the scope of the invention. The loops and ring may be wound from one continuous wire.

I claim:—

1. A flower-stand for inserting in bowls and vases, comprising a plurality of loops held together by a ring.

2. A flower-stand as specified in claim 1, in which the loops are flexible.

3. A flower-stand for inserting in bowls and vases, comprising a single wire bent in double loops, the end of the wire being wound around said loops to form a ring holding said loops together.

ELLY ÖSTERLUND NÉE MALMQVIST.